United States Patent

[11] 3,601,530

[72] Inventors Robert C. Edson
Brielle;
Doren Mitchell, Martinsville; George P. Reid, Holmdel, all of, N.J.
[21] Appl. No. 820,131
[22] Filed Apr. 29, 1969
[45] Patented Aug. 24, 1971
[73] Assignee Bell Telephone Laboratories, Incorporated
Murray Hill, N.J.

[54] VIDEO CONFERENCE SYSTEM USING VOICE-SWITCHED CAMERAS
30 Claims, 13 Drawing Figs.

[52] U.S. Cl. ........ 178/5.6, 178/5.8, 178/DIG. 30, 179/1 CN, 179/2 TV
[51] Int. Cl. ........ H04n 5/24
[50] Field of Search ........ 178/5.6, 5.8, 6 TM, 6 PD, 6, 6.8, 7.2 ST; 179/1 H, 1 CN, 2 TV; 235/51, 52

[56] References Cited

UNITED STATES PATENTS

| | | | |
|---|---|---|---|
| 3,050,584 | 8/1962 | Miller | 179/1 |
| 3,128,348 | 4/1964 | Lummis | 179/1 |
| 3,369,073 | 2/1968 | Scholz | 178/5.6 |
| 3,419,674 | 12/1968 | Burns et al. | 179/2 |
| 3,423,532 | 1/1969 | Coel et al. | 179/1 |
| 3,492,419 | 1/1970 | Bartonik | 178/6.8 |
| 3,515,807 | 6/1970 | Clark | 179/1 |

*Primary Examiner*—Robert L. Richardson
*Assistant Examiner*—P. M. Pecori
*Attorneys*—R. J. Guenther and E. W. Adams, Jr.

ABSTRACT: This disclosure relates to a video conference system for a plurality of groups of remotely located conferees. At each group location, a plurality of video cameras are used and the field of each is restricted to a small number of persons in the group. Voice voting and switching are used to determine the location of the person in the group who is talking and to "enable" the appropriate camera, in response thereto, so that the talker will be seen at the remote location. As different people in the group speak, the appropriate cameras covering the same are successively enabled so that the outgoing video signal matches the audio signal. Operational features include a graphic mode, for the remote display of written or graphic material, and a conference leader mode, in which the system is biased in favor of the leader so as to give him substantial control over the conference.

INVENTORS R. C. EDSON
D. MITCHELL
G. P. REID
BY John K. Mullarney
ATTORNEY

| | | | |
|---|---|---|---|
| FIG. 4 | FIG. 5 | FIG. 6 | FIG. 7 |
| | | FIG. 9 | FIG. 8 |

VIDEO CONFERENCE SYSTEM USING VOICE-SWITCHED CAMERAS

BACKGROUND OF THE INVENTION

This invention relates to vial telephone systems and more particularly, to a video system for conference connecting two or more groups of remote conferees in a manner which approaches a true face-to-face conference situation.

Visual telephone systems presently provide communication between at least two locations. With the use of wide-angle lenses at these locations, a video conference can be provided for two groups of remotely located conferees. Even though such arrangements are somewhat expensive, it has been recognized for some time that this type of communication has the potential of greatly reducing travel and thus justifying substantial expense. Obviously, the reduction of travel not only saves travel expenses, but even more importantly, the time of highly paid personnel. Now this wide-angle lens approach is acceptable if each of the groups of conferees is small in number. To achieve good visual contact (i.e. to approximate a true face-to-face conference situation) it is not practical to try to view more than a few people (e.g. three or four) at a time. As the number of conferees in a group increases, it becomes increasingly difficult to identify the conferees at the other location and specifically the particular person talking at a given time.

Present day commercial television has, at times, provided programs which contain discussions between two groups of remote conferees. In some instances, a technician at each group location manually points or aims the television camera at the person presently talking and may even manually "-zoom" in on the speaker to achieve good visual contact. In other cases, several fixed cameras are used and the technician manually camera-switches between the participants of the conference in order to display to the viewing audience the person then talking. These prior art approaches to a true face-to-face conference situation have not been entirely satisfactory. The technicians are expensive and of course they are fallible. It often happens that the camera is aimed at the wrong person—i.e. at someone other than the present speaker. If conferencing by way of visual telephone is to be at all possible, the luxury of manual switching by video technicians can not be permitted.

Accordingly, the primary object of the present invention is to establish a visual telephone conference connection between at least two groups of remote conferees which closely approximates a true face-to-face conference situation.

A related object of the invention is to provide a video conference arrangement which utilizes voice-controlled switching to automatically direct the field of view of the participants at one end of the line toward the source of speech at the other end.

SUMMARY OF THE INVENTION

In accordance with the present invention two, or more, groups of remotely located conferees are connected by a two-way video conference system which, in function, approaches a true face-to-face conference situation. At each location, a plurality of video cameras are used and the field of each is restricted to a relatively small number of people who can be seen well enough to provide good visual contact. Voice voting and switching are used to determine the location of the person in the group who is talking, and in response thereto the appropriate camera is enabled so that the talker will be seen at the remote location. To this end, a plurality of microphones, equal in number to the video cameras, are positioned before a group; the microphone positions with respect to the group correspond to fields of view of the cameras. The location of the person who is speaking is determined by the level of speech signals generated in each of the microphones. In response to the loudest speech signal, a voting circuit causes the camera which is covering the microphone generating the loudest speech signal to be enabled. And it is this video image that is transmitted to the remote location along with the audio signal. As different people in the group speak, in turn, the appropriate cameras covering the same are successively enabled so that the outgoing video provides a good visual image of the person when talking. A corresponding operation takes place at the other location, i.e. the video conferencing is two-way.

It is a feature of the invention to provide a group of conferees with a display of the outgoing video. Thus, each conferee sees an image of the person in his group who is presently talking, even though he might not be able to see the talker directly because of intervening conferees. This feature also provides a "self-view" so that a person can verify the fact that he is adequately covered by a camera.

A further feature of the invention is the provision of an "overview" camera with a wide-angle lens so as to take in the whole group of conferees at a given location. In the presence of a sustained silence (e.g. 12 seconds) at a location, the switching reverts to the overview camera. Thus, one end or location will periodically be given a view of the whole group at the other end. Among other uses, this feature shows how the conferees are seated and tells one end when one or more conferees at the other end has left the conference room.

A still further feature of the invention is an optional graphic mode of operation which permits the visual exchange of graphic or written material. And in a still further modification of this, a combined graphic-voice-switching mode of operation is possible. In this latter mode, the system continually reverts to the graphic display, but other cameras may be selectively voted in (i.e. enabled) in response to sustained speech. This hybrid mode of operation is advantageous when graphic material is being presented with the expectation that the same will be commented on by local conferees.

In accordance with another feature of the invention an optional conference leader mode of operation is provided. In this mode, the switching system is biased in favor of the conference leader, so as to provide him with a substantial degree of control over the conference at his location. Such a bias is, of course, analogous to that appropriated by a leader in a true face-to-face conference situation.

BRIEF DESCRIPTION OF THE DRAWINGS

The invention will be more fully appreciated from the following detailed description when considered in connection with the accompanying drawings in which.

DETAILED DESCRIPTION

Figure 1:
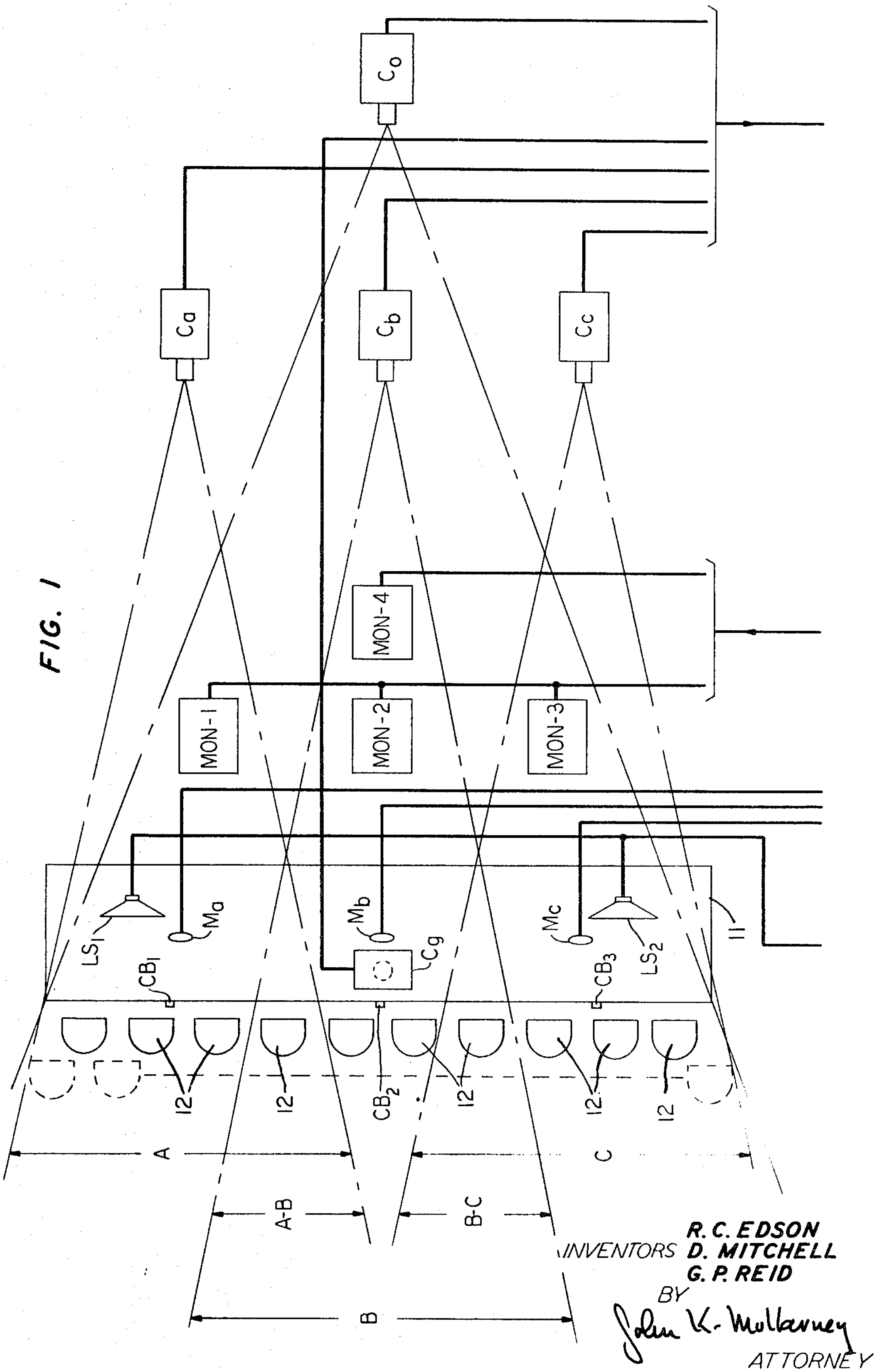
FIGS. 1 and 2, when arranged as shown in FIG. 3, show a schematic block diagram of a visual telephone system constructed in accordance with the principles of the present invention.
Figures 2, 3:
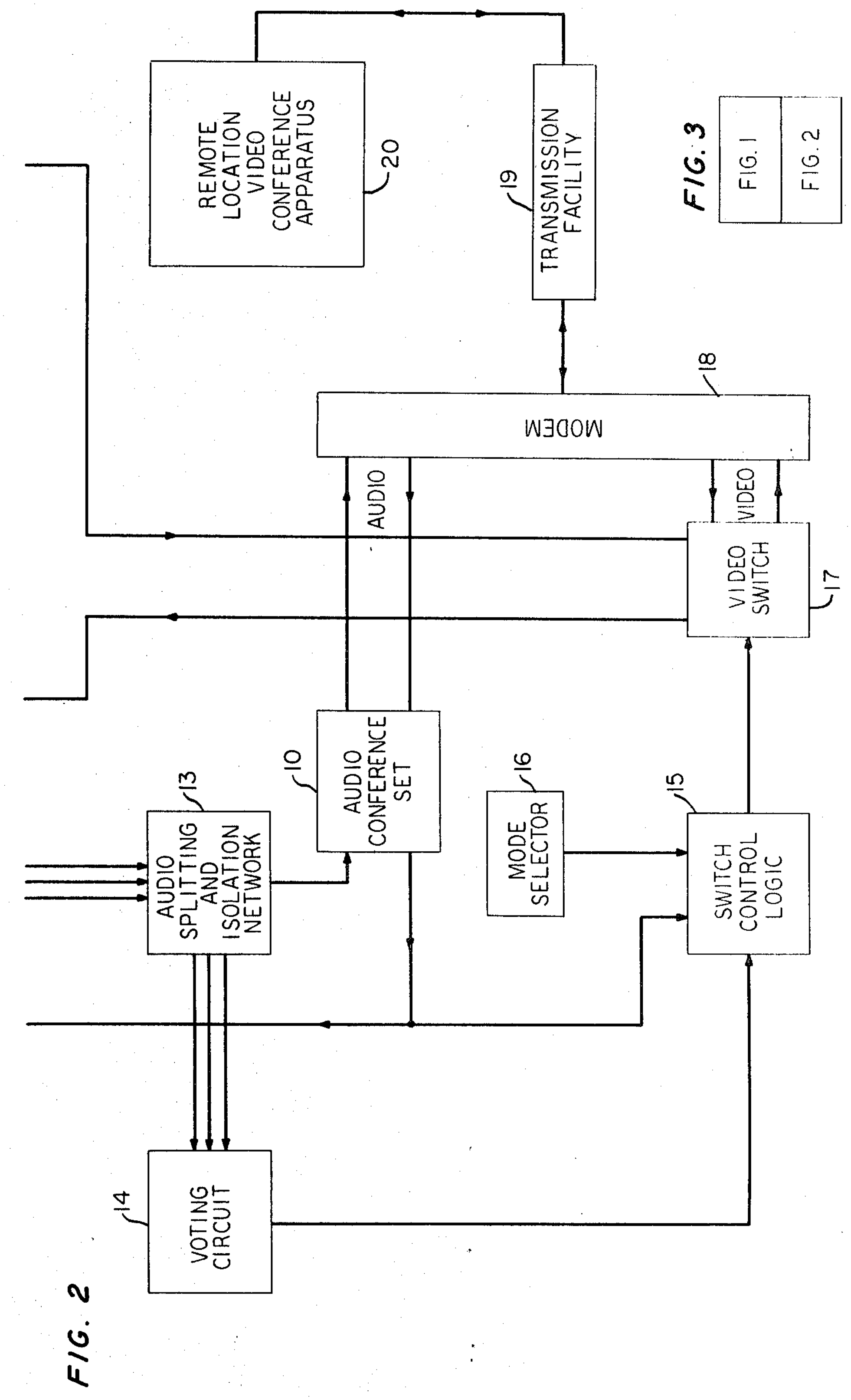

Turning now to the drawings, FIGS. 1 and 2 show in schematic block diagram a visual telephone system, which conference-connects two groups of remotely located conferees. For purposes of illustrating the various features and aspects of the invention only a two-group conference situation need be considered. However, as will be evident hereinafter, the features of the invention are in no way limited thereto and have equal applicability to a three-group conference, a four-group one, etc. For more than two groups of remote conferees, some additional switching should be employed to interconnect automatically the remote groups. This additional switching can be of the same nature as that disclosed in the copending application of I. Dorros, D. B. Robinson, Ser. No. 646,525, filed June 16, 1967, now Pat. No. 3,519,744.

The visual telephone system of FIGS. 1 and 2 comprises a near end or proximate location, shown in detail, and a far end or remote location, indicated by reference numeral 20. The apparatus and modes of operation for the two locations are the same and hence only the one location need be covered in detail herein.

A typical terminal or conference location is schematically shown in plan in FIG. 1. Variations, particularly in the physical arrangement, will be evident hereinafter and hence it should be clear that the principles of the invention are in no way limited to the arrangement illustrated. For example, three cameras $C_a$, $C_b$, $C_c$ are used in FIG. 1 to cover the local group of conferees, but two, or four, or five cameras can just as readily be utilized, in the manner to be described, with only minor modification of the station equipment. Other variations of the same nature will be evident.

A table 11, of a nondescript nature, is shown to have 10 chairs 12 disposed along its length—one chair per conferee. A second row of chairs can, if necessary, be placed directly behind chairs 12. Three video cameras $C_a$, $C_b$, and $C_c$ are shown and the field of each is restricted to a sufficiently small number of people (four in this case) who can be seen well enough to provide good visual contact.

The fields of view of the cameras are designated A, B, and C, respectively. For each of these fields or regions there is also provided a microphone ($M_a$, $M_b$, $M_c$) and a typical television receiver or monitor (MON–1, MON–2, MON–3). The microphones are placed on table 11 more or less centrally disposed with respect to the field of view of the associated camera, e.g., microphone $M_a$ is approximately centered with respect to field or region A of camera $C_a$. The monitors are set across the table and preferably are large (e.g., 24 inches) so that the images of the distant parties that appear thereon are about life size. A pair of loudspeakers $LS_1$ and $LS_2$ can also be positioned on the table, as shown, or, alternatively, they can hang down from the ceiling in a known manner. Location of the loudspeakers should be such that acoustic coupling to the microphones is minimized.

An additional camera $C_o$ is provided with a wide-angle lens so that it takes in the whole group of conferees—this camera is designated hereinafter as the "overview" camera. A further camera $C_g$ is typically mounted in the ceiling of the conference room and it is provided with a "zoom" lens system so that it can view graphic or written material disposed on the table therebelow. The zooming is carried out electromechanically under pushbutton control, the button being located near either, or both, of the middle chair locations. A fourth monitor MON–4 is centrally disposed with respect to the group of conferees and it normally displays the outgoing video signal. The cameras and monitors are typically at different elevations so as not to interfere with the respective views thereof.

A pushbutton assembly not shown is used to select the mode of operation and it is placed adjacent one of the middle chair locations, preferably near the chair intended for the conference leader. The cough buttons $CB_1$, $CB_2$, and $CB_2$, are located as shown in FIG. 1 and these may be used as desired to prevent a cough turning on a camera or to assure privacy for a side conversation at a given location.

Since the conferees are preferably seated in a normal or natural fashion, i.e., at uniformly spaced positions, the fields of view or regions A, B, and C of cameras $C_a$, $C_b$, and $C_c$ will overlap and some conferees will, of course, be located in the midregions A–B and B–C. It is a particularly advantageous feature of the voting circuit of the present invention to positively detect when a speaker is in such a midregion and to eliminate all possible camera-switching ambiguities that might result therefrom.

The microphones $M_a$, $M_b$, and $M_c$ are used for both audio and location detection (i.e., location of the talker) purposes and hence the output of each is initially coupled to an audio splitting and isolation network 13. The latter network delivers a respective portion of the speech energy of each microphone to the voting circuit 14, with the remaining portions of the speech energies then combined and delivered to the audio conference set 10. To establish an audio conference connection between two or more groups of conferees at remote locations and to assure sufficient volume at each location, it is common practice to use voice switching of speech to reduce the problems of echo and singing due to acoustic feedback. The audio conference set 10 is utilized herein to these ends and any one of several known voice-switching networks can advantageously be used in the present system. For example, the audio conference set 10 can be of the type disclosed in the article "General Transmission Considerations in Telephone Conference Systems" by D. Mitchell, *IEEE Transactions on Communication Technology*, Feb. 1968, Vol. Com-16, No. 1, pages 163–167. The incoming audio signal from the remote location is coupled to the loudspeaker $LS_1$ and $LS_2$ via this audio conference set.

The voting circuit 14 serves to detect the location of the talker in the group. The speech energies from the microphones $M_a$, $M_b$, and $M_c$ are compared in the voting circuit and a decision is made as to which is the strongest. This is done on the basis of the speech envelope. If the speech energy from microphone $M_a$ is the strongest, an appropriate signal is delivered by the voting circuit 14 to the switch control logic 15 which, in response thereto, serves to "enable" camera $C_a$ so that the remote conferees see the talker who is in region A.

As the name implies, the mode selector 16 serves to select the desired mode of operation at that location. This selection is done manually by depressing the appropriate pushbutton. There are four modes of operation and each will be covered in detail hereinafter.

The switch control logic 15 receives the output signals from the voting circuit 14 and in response thereto, and in accordance with the mode established in mode selector 16, it delivers the appropriate signals to the video switch 17 to selectively connect the video cameras and the receiver monitors to the outgoing and incoming video lines. The possible permutations in the connections established in the video switch 17, in response to signals from the control logic 15, are too numerous to be here set forth; these will be set forth in detail below.

In addition to selectively energizing the video switch 17, numerous other functions are carried out by the switch control logic 15. For example, control logic 15 contains memory to decide which camera should be selected when a talker is in the midregion between two cameras, and memory to keep a camera activated or enabled during pauses in speech. It also includes circuitry which initiates a reversion to the overview camera $C_o$, or in another instance to the graphic camera $C_g$, in the presence of a sustained silence. These and other functions of the control logic 15 will be covered in detail later.

The video switch, in response to the enabling signals from control logic 15, establishes the necessary video interconnections in accordance with the desired functional modes of operation set forth below. When a camera is said to be enabled, it is in fact connected via the video switch 17 to the outgoing or incoming video line, as the case may be.

To prevent the loudspeakers from initiating a camera-switching operation, the incoming audio signal, delivered to the speakers $LS_1$ and $LS_2$, is also coupled to the control logic 15 where it performs an inhibit operation.

The video switch 17 and the audio conference set 10 are each 4-wire connected to the MODEM 18. The word MODEM is a commonly used acronym for the modulator-demodulator apparatus of a transmitting-receiving terminal or station. That is, a MODEM comprises all the necessary apparatus forming the interface between the terminal equipment, of whatever nature, and the transmission facility. This interface apparatus modulates the outgoing signals (i.e., the video and audio) onto distinct and appropriate carriers, and for the incoming signals it demodulates each and delivers the same to the appropriate station equipment.

The transmission facility 19 may comprise any of the known transmission links such as coaxial cable, radio relay, et cetera. It will be obvious to those in the art that the station equipment in accordance with the present invention is in no way limited to any particular transmission facility or interface apparatus.

Before proceeding with the detailed explanation of the schematic diagram of FIGS. 4 through 9 and the numerous operations thereof, it should prove advantageous to set forth at this point the four basic modes of operation of the video conference system. Each of these operating modes is available at each location.

Normal Mode

In this mode a conferee will see whatever video is being sent from the remote end on monitors MON–1, MON–2 and MON–3. The conferee also sees the outgoing video, sent from the local station to the remote one, on the centrally disposed, overhead monitor MON–. Speech from anyone in the A, B or C regions will vote in (i.e., enable) the proper camera so as to show the speaker. Thus, the outgoing video will in this instance match the audio. The last speaker will remain on camera for a short time (e.g. several seconds) unless someone else talks. When someone else, in a different region, talks the camera covering him is enabled and the previously enabled camera is disabled. If no one talks for a given period, the overview camera $C_o$ is enabled so as to show the whole group of conferees to those at the remote end. A conferee in a midregion is covered by two cameras; when such a conferee talks one, or the other, of the two cameras will be enabled in accordance with "memory logic" in the switch control logic 15.

Locked Graphic Mode

In this mode the graphic camera $C_g$ is locked to the outgoing video line and it is also connected to the three local monitors MON–1, MON–2, and MON–3 for local viewing of the graphic material. The monitor MON–4 now shows the video signal from the remote end. No other camera (e.g. $C_a$, $C_b$, $C_c$) can be connected or enabled with the system in this mode, i.e., no voice controlled, camera switching can occur.

Automatic Graphic Mode

This is similar to the locked graphic mode except that sustained speech in region A or C will vote in camera $C_a$ or $C_c$. A pause of a few seconds, or even a brief speech by someone in region B, switches the system back into the graphic mode. Thus, the system is, in this case, biased in favor of the graphic mode.

Conference Leader Mode

This mode is used for lectures or for any other situation in which it is desired to view the conference leader as much as possible. The leader will sit at one of the middle chair locations, in region B. A sustained speech in region A or C is required to vote in camera $C_a$ or $C_c$. And a short pause in the latter or a brief speech from region B, once again enables camera $C_b$. Thus, the system is biased in favor of the conference leader positioned in region B. The monitors MON–1, MON–2 and MON–3 show the video from the far end, while MON–4 displays the outgoing video.

As the name would imply, the normal mode is the one normally utilized. The following description will, therefore, consider the detailed logic circuitry and its functions with regard to this mode. The interaction of the various ancillary features (e.g. reverting) and alternative operating modes (e.g. graphic and leader) will then be subsequently covered in detail.

Figure 4:
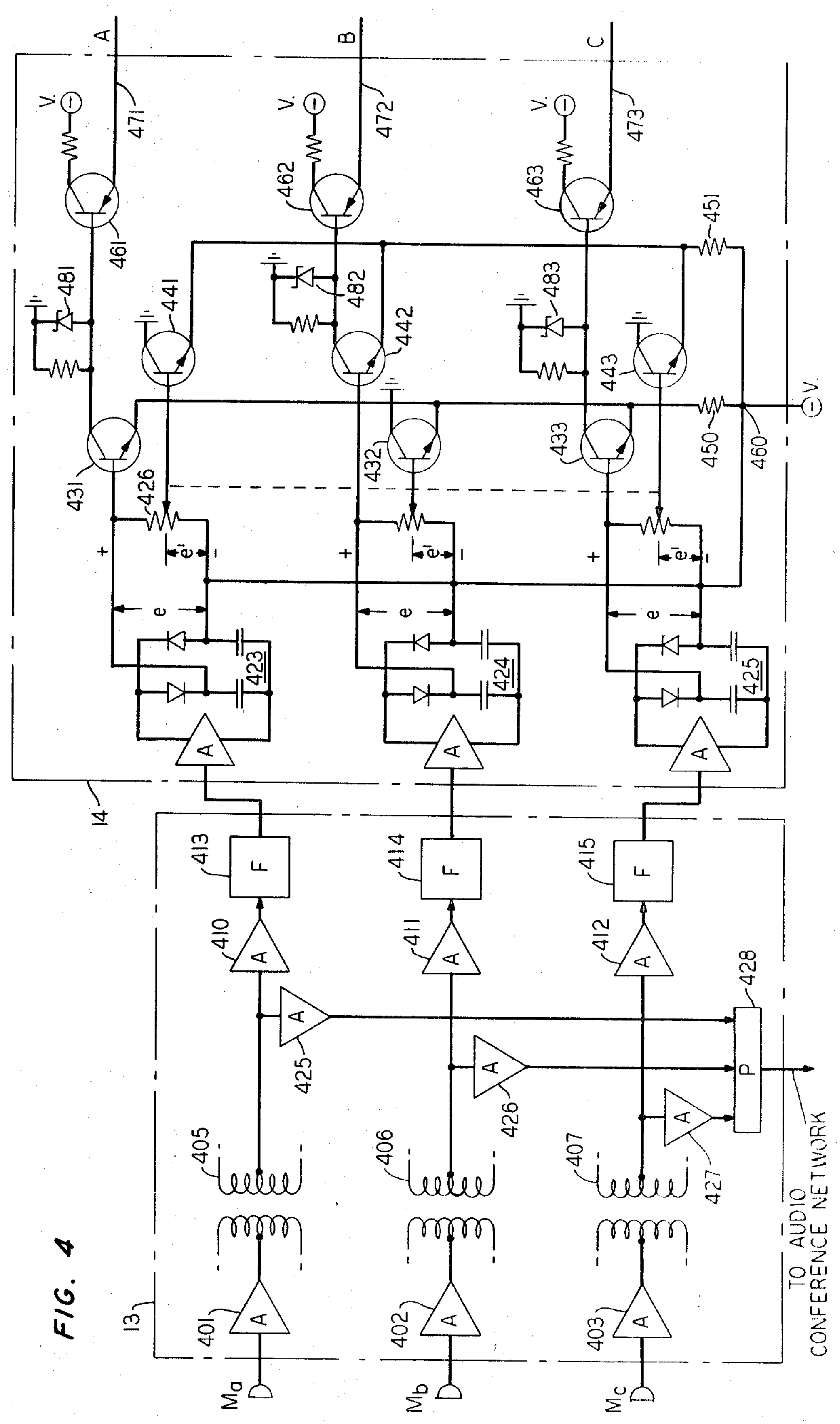
FIGS. 4 through 9, when arranged as shown in FIG. 10, show a detailed schematic drawing of the voting circuit, mode selector and switch control logic, shown in block form in FIG. 2.

Turning now to FIGS. 4 through 9, and first to FIG. 4, the output signals of microphones $M_a$, $M_b$ and $M_c$ are coupled via the preamp stages 401, 402 and 403, the impedance-matching transformers 405, 406 and 407 and the buffer or isolation amplifiers 410, 411 and 412 to the band-pass filters 413, 414 and 415. The filters have the same passband (e.g. 600–3,200 Hz.) and are used primarily to filter out nonspeech sounds. The microphone outputs are, as heretofore indicated, also used for audio conferencing purposes and, to this end, a portion of each microphone output is coupled, via the respective isolation amplifiers 425, 426 and 427, to the four-way resistance pad 428. This pad is conventional and serves merely to combine the microphone output signals and thence delivers the same to the audio conference set 10.

The output signals of filters 413–415 are delivered to the voting circuit 14 for the purpose of detecting the location of the talker in the group. This determination of location is made by a comparison of the amplitudes of the speech envelopes picked up by the microphones. When a talker is decidedly in one, and only one, given region (i.e., A, B or C), a simple amplitude voting operation takes place. The voice-operated voting circuit, however, also determines if the talker is located in a midregion by comparing the amplitude of the speech energy received by adjacent microphones. When the difference in received energy is less than a preset value (e.g. 2 db.) the signal will be recognized as one coming from a midregion between two microphones. As will be covered hereinafter, the physical width of the microphone midregions can be varied and they preferably should correspond to the camera midregions (A–B, B–C). When it has been determined that the talker is in a midregion, a decision must be made to turn on one of the two adjacent cameras; the control logic 15 makes this decision in a manner which will be covered hereinafter.

Considering the voting circuit now in greater detail, the output signals of filters 413, 414 and 415 are respectively delivered to three full-wave, voltage doubler rectifiers 423, 424 and 425 which, as will be recognized, are of a conventional design. The rectified outputs are smoothed by the capacitors shown. Two transistors are connected to each rectifier output *e*. For example, the bases of transistors 431 and 441 are connected across the output of rectifier 423, with the base of transistor 441 being connected, of course, via the potentiometer 426. As indicated, the three potentiometer arms are preferably ganged. The transistors 431–433 and 441–443 are also connected in a two-stage, common emitter, comparator configuration. That is, the transistors 431, 432 and 433 have their emitters connected to the source –V. via the common emitter resistance 450, and the transistors 441, 442 and 443 likewise have their emitters connected to said source via the common emitter resistance 451. The transistors 461, 462 and 463 comprise conventional emitter follower stages.

The comparator circuit operates in the following manner. Assume, first, that the talker is in the midregion A–B and the signals to the microphones $M_a$ and $M_b$ are thus substantially the same and produce a voltage *e* at each rectifier output (i.e. rectifiers 423 and 424) equal to 10 volts. Also, assume that the arm or tap of each potentiometer is adjusted to provide a voltage $e'$ of 7.95 volts at the tap point (note, 20 log 10/7.95=2 db.). Accordingly, the relative value of voltages measured between each base and reference point 460, for the first set of emitter coupled transistors 431, 432 and 433, are such that transistor 431 conducts and transistors 432 and 433 are cut off. This cutoff of transistors 432 and 433 is due to the high-emitter current flow of transistor 431 through the common emitter resistance 450. This operation is typical of common emitter comparators. In the second set of emitter-coupled transistors 441, 442 and 443, a corresponding operation takes place and transistor 442 conducts and transistors 441 and 443 are cut off. With transistors 431 and 442 conducting, the emitter follower transistors 461 and 462 are caused to conduct and an energizing signal is delivered to each of the output leads 471 and 472. This output is indicative of the fact that the talker is intermediate region A and region B, i.e., he is in midregion A–B.

The more common situation is where the talker is decidedly in one, and only one, given region. Assume, for this case, that the talker is in region A and the signal to microphone $M_a$ is such as to provide an output voltage *e* from rectifier 423 of 10 volts and a voltage *e* from rectifier 424 of something less than 7.95 volts. The output of rectifier 425 will, of course, be even less than that of rectifier 424. For the first set of emitter-coupled transistors 431, 432 and 433, the transistor 431 conducts and transistors 432 and 433 are cut off. In the second set of emitter-coupled transistors 441, 442 and 443, the transistor 441 conducts since its input (7.95 volts) is greater than the input to transistor 442. This is because the output of rectifier 424 was assumed to be something less than 7.95 volts. Since transistor 441 is conducting, transistors 442 and 443 are cut off and only the voting circuit output lead 471 is energized. This output is indicative of the fact that the talker is located in, and only in, region A.

The ganged potentiometers control the physical width of the midregions between adjacent microphones. The greater the difference between the voltages $e$ and $e'$, the larger the midregions, and, conversely, the smaller this difference, the smaller the midregions. The microphone midregions should correspond more or less to the overlap or midregions defined by the cameras. This preferred setting of the potentiometers can be arrived at empirically by talking in a known midregion location and then while talking in a monotone gradually shift position until a camera switching occurs. The display on local monitor MON–4 will provide an indication of the degree of correspondence between the microphone and camera midregions.

The zener diodes 481, 482 and 483 serve to prevent the associated transistors from going into saturation; this extends the operating range of the comparison circuitry.

Figure 5:
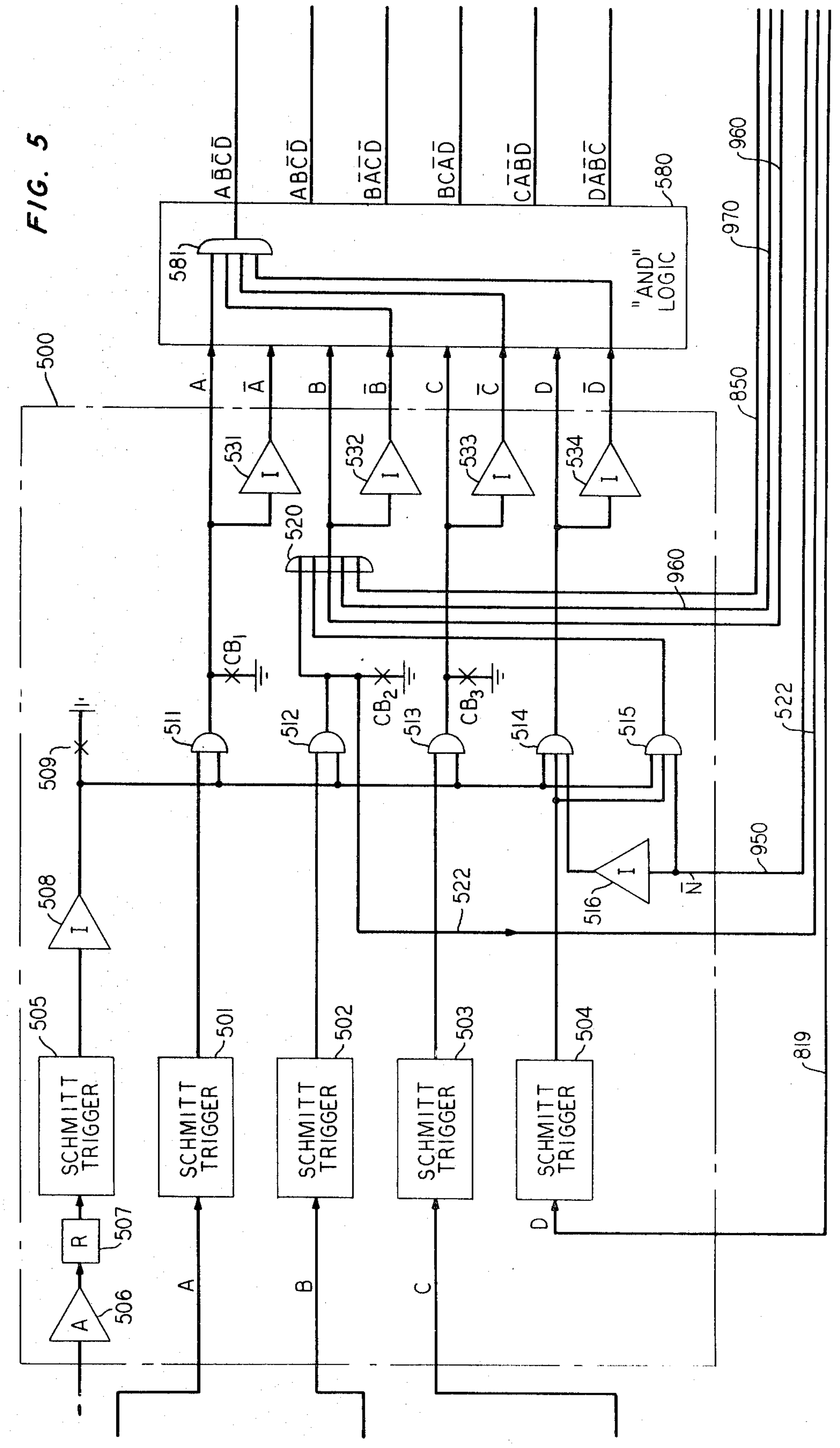

The output signals of the voting circuit 14 are coupled to the analog to digital interface circuit 500, of FIG. 5. As the name would imply, circuit 500 serves as an interface to convert the rectified analog signals, on the voting circuit output leads 471, 472, and 473, to binary signals. This conversion is carried out by Schmitt trigger circuits 501, 502 and 503, which are respectively connected to each of the output leads 471, 472 and 473. When the magnitude of the input analog signal is above a predetermined threshold value (e.g. 2.2 volts) the Schmitt trigger goes to a "one" state, and when the input signal drops below a predetermined turnoff threshold (e.g. 1.4 volts) the Schmitt trigger will return to the "zero" state. To account for the dropoff in speech level which typically occurs toward the end of a sentence, a 4 db. hysteresis should preferably be incorporated into the Schmitt trigger circuitry. This is a known procedure commonly employed in the design of Schmitt trigger circuits. With a 4 db. hysteresis, the input signal must drop, in the assumed case, to less than 1.4 volts before the Schmitt trigger returns to its "zero" state.

The AND gates 511, 512 and 513 are connected to the Schmitt trigger circuits 501, 502 and 503 and, when enabled, these gates couple the Schmitt trigger output signals to the leads designated A, B and C, respectively. This lead designation corresponds to talker location. For example, when the talker is in region or field A, the Schmitt trigger 501 is set to its one state and thus delivers a binary "1" or level-one signal to the lead A via the AND gate 511.

An inhibiting function must be provided to prevent camera switching while speech is being received from the distant terminal. This is necessary to prevent the received speech that is acoustically coupled into the microphone circuits from causing false switching. To this end, the incoming audio signal, delivered to the loudspeakers, is also coupled to the amplifier 506 of the interface circuit 500 of FIG. 5. The incoming audio signal is amplified, rectified, in rectifier 507, and thence delivered to the Schmitt trigger 505. The output of Schmitt trigger 505 is inverted, in inverter circuit 508, and delivered to the input of AND gates 511–515. In the absence of an incoming audio signal, the inverter circuit 508 delivers an enabling "1" or level-one signal to these AND gates. However, with the occurrence of an incoming audio signal, the Schmitt trigger 505 goes to its "one" state and a binary "1" signal is delivered to inverter 508 where it is inverted to a binary "0" signal, which serves to disable AND gates 511–515. With gates 511–515 disabled, all voice-controlled camera switching is inhibited.

As indicated hereinbefore, in the locked graphic mode, all voice-controlled camera switching should likewise be prevented. The make-contract 509 provides this function. When the locked graphic mode is manually selected, the make-contact 509 is closed causing a binary "0" signal input to AND gates 511–515 to thereby disable the same.

To prevent a cough from turning on a camera, the cough button contacts $CB_1$, $CB_2$, and $CB_3$ are connected between ground and the output leads of AND gates 511, 512 and 513, respectively. When a cough button is depressed, the make-contact thereof shorts the appropriate AND gate output to ground and hence camera switching in response to a cough is prevented.

For the normal mode, the occurrence of a sustained silence results in the switching microphone reverting or respect to the overview camera $C_o$. For the automatic graphic mode, the occurrence of a sustained silence of given duration results in the reverting of the switching circuit back into the graphic mode, i.e., camera $C_g$ is enabled. And for the conference leader mode, a sustained silence results in the reversion of the switching to camera $C_b$, which covers the leader. The signal that initiates this reversion is generated in the automatic reverting circuit 800 of FIG. 8, which will be described in detail hereinafter. This reverting signal is delivered to the input of the Schmitt trigger 504. The reverting signal is in the nature of an RC-charging waveform, which, in the presence of a sustained silence, increases until it reaches the threshold value of the Schmitt trigger circuit 504. The Schmitt trigger then goes to its "one" state and remains in this state for a duration (e.g. 150 milliseconds) somewhat greater than the delay time indicated on waveform $e$ of FIG. 12. The reason for this delay duration will be evident hereinafter. At the end of said delay, the circuitry of the reverting circuit 800 is reset to its initial condition and the Schmitt trigger 504 is thereby returned to its "zero" state.

The AND gates 514 and 515 and the inverter 516 provide a steering function for the output signal of Schmitt trigger 504. For the normal mode N, the input to inverter 516 is a level-zero signal (i.e., binary "0") and hence the inverter, in this case, delivers a binary "1" signal to the AND gate 514 to enable the same so that the output of Schmitt trigger 504 is coupled to the lead designated D. For any mode other than the normal mode $\overline{N}$—i.e., not the normal mode), an energizing input signal (i.e., level-one) will be delivered from the mode selector logic circuit 900 of FIG. 9, via the lead 950, to the input of inverter 516. This level-one signal is inverted to a level-zero signal, which serves to disable the AND gate 514. The AND gate 515 is not enabled, however, by the level-one input to the inverter 516 and thus the output of Schmitt trigger 504 is coupled to the lead designated B, via the AND gate 515 and OR gate 520. Here again, the generation of this level-one $\overline{N}$ signal will be described in detail hereinafter.

There are five distinct inputs to the OR gate 520, and hence OR gate 520 serves to deliver a binary "1" signal to the lead designated B for any one of five distinct conditions or situations. First, if the Schmitt trigger 502 is set to its "one" state in response to a speech signal above the threshold level, a binary "1" signal will be coupled from Schmitt trigger 502 to the lead B via the normally enabled AND gate 512 and OR gate 520. Second, if a reverting signal sets the Schmitt trigger 504 to its "one" state and the system is in any mode but normal one (i.e., $\overline{N}$), a binary "1" signal is delivered to lead B via the AND gate 515 and OR gate 520. Third, if the locked or manual graphic mode is selected, an energizing level-one signal is delivered from the mode selector logic circuit 900 via the lead 960 and OR gate 520 to lead B. Fourth, when the automatic graphic mode is initiated, the one-shot multivibrator 975, of FIG. 9, is enabled and delivers a short-duration pulse to the OR gate 520 via lead 970. As will be evident hereinafter, this pulse initiates the enabling of the camera $C_g$. This short-duration pulse occurs only once —i.e., with the selection of the automatic graphic mode. In this mode, it will be recalled, a talker in regions A or C can vote in cameras $C_a$ or $C_c$; however, the system continues to revert to the graphic display. This reversion is initiated in each instance by the reverting signal delivered to Schmitt trigger 504. The short duration pulse from the one-shot multivibrator 975 should be somewhat greater in duration than the delay time designated in waveform $e$ of FIG. 12. And fifth, a binary "1" signal, which is in the nature of an ancillary or extra hangover signal, is delivered from the flip-flop 820 of FIG. 8 via the lead 850 to OR gate 520. This ancillary hangover signal establishes a preference in favor of speech at the B position—i.e., in field or region B of FIG. 1. This preference is desirable when operating in the leader or automatic graphic modes.

The output of AND gate 512 is coupled via lead 522 to the extra hangover circuit 810 of FIG. 8 where it serves to reset flip-flop 820 in the manner to be described hereinafter.

The inverters 531, 532, 533 and 534 are coupled to the leads designated A, B, C and D and they serve to provide at their respective outputs the inversions thereof—i.e., $\overline{A}$, $\overline{B}$, $\overline{C}$ and $\overline{D}$. Thus, if input A is a binary "1" signal, then A is a binary "0"—and vice versa. This, and the following, is conventional Boolean algebra notation. The AND gate logic 580 converts the eight binary signal inputs (A, $\overline{A}$, B, $\overline{B}$, etc.) to one of six logical output signals: $A\overline{BCD}$, $AB\overline{CD}$, $B\overline{ACD}$, $BC\overline{AD}$, $C\overline{ABD}$ and $D\overline{ABC}$. Since this AND gate conversion process is straightforward only a single example need be given; for instance, the signal $A\overline{BCD}$ is derived by connecting the input of AND gate 581 to the input leads designated A, $\overline{B}$, $\overline{C}$ and $\overline{D}$.

The $A\overline{BCD}$ signal output is indicative of the fact that the talker is in field or region A; a $B\overline{ACD}$ output signal indicates, among other things, that the talker is in region B; and a $C\overline{ABD}$ signal locates the talker in region C. The $AB\overline{CD}$ signal is indicative of the fact that the talker is in the midregion A—B, and a $BC\overline{AD}$ signal indicates the talker to be in midregion B—C. The $D\overline{ABC}$ signal is indicative of a camera-reverting situation, which it will be recalled, is initiated by a sustained silence.

Of the six signals from the AND gate logic 580 it is necessary to divert the midregion signals $AB\overline{CD}$ and $BC\overline{AD}$ to the appropriate camera. For example, the signal $AB\overline{CD}$ can be diverted onto the $A\overline{BCD}$ signal output lead so as to cause the enabling of camera $C_a$, or, alternatively, it can be diverted to the $B\overline{ACD}$ signal output lead so as to cause the enabling of camera $C_b$. Either camera $C_a$ or $C_b$ can, of course, be used to provide a video image of a talker in the A–B midregion.

There are several ways in which this diverting of the midregion signals can be carried out. One obvious choice might be to always divert an A–B midregion signal ($AB\overline{CD}$) to camera $C_a$. This is, however, not a very good choice, since a talker positioned near the A–B and B fields or regions will first cause one then the other camera to be turned on by only a slight movement of his position. This causes switching ambiguities and thus is not too desirable a rule of operation. Another rule would be to turn on the camera which is physically nearest the camera which had been viewing the last talker. This can be implemented by the addition of some relatively simple memory logic circuits. A more sophisticated rule, and the one utilized herein, is to remember which of the two cameras (e.g. $C_a$ or $C_b$) was last turned on and to divert the midregion signal to that camera path in the logic circuitry.

Figure 6:
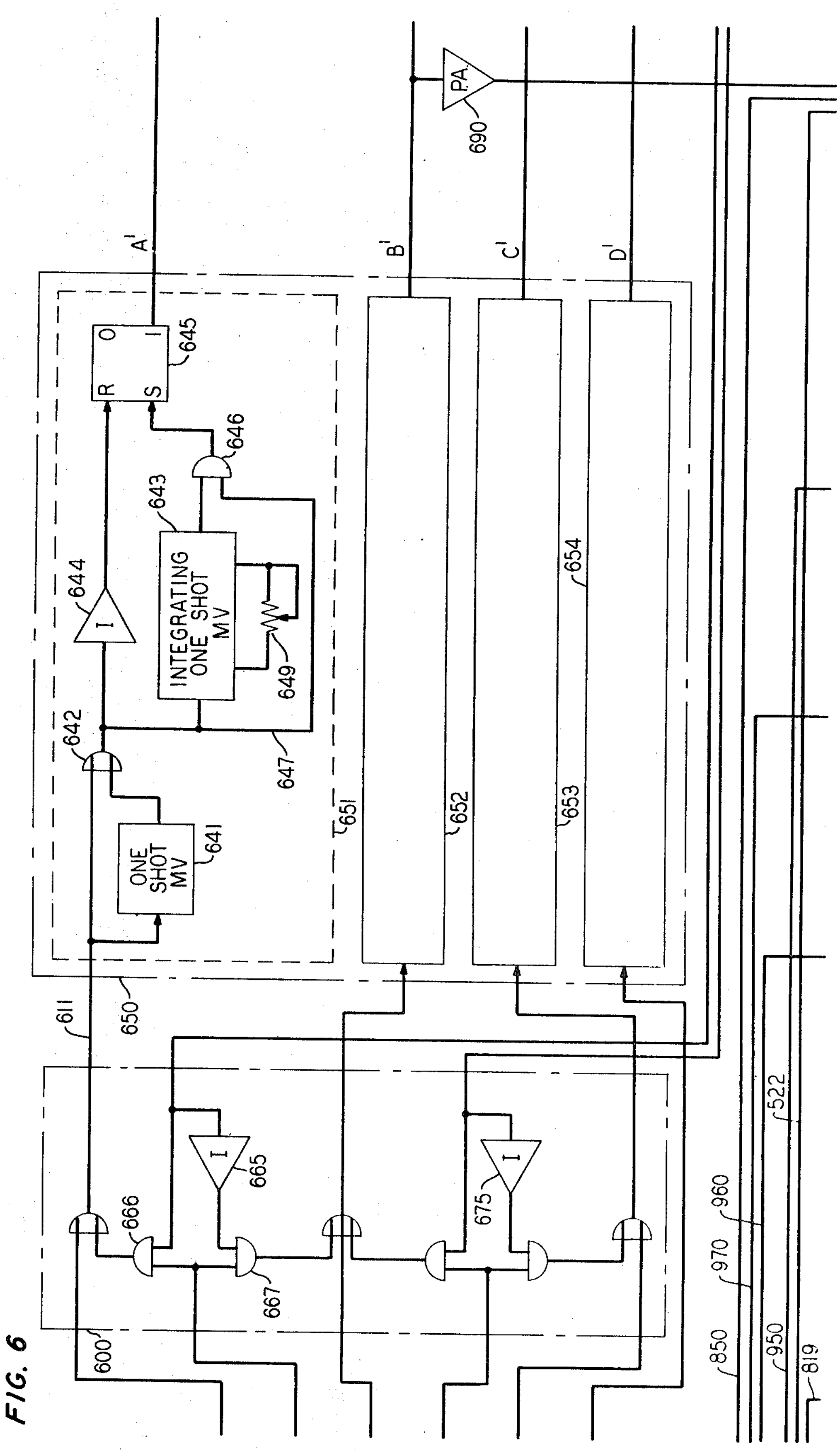

This diverting operation is carried out by the diverter logic 600 of FIG. 6. It should first be noted that the signals "A only" ($A\overline{BCD}$), "B only" ($B\overline{ACD}$) and "C only" ($C\overline{ABD}$) are not affected by this logic circuitry. The midregion signals $AB\overline{CD}$ and $BC\overline{AD}$ are each delivered to a respective steering circuit which carries out said diverting operation. The flip-flops 765 and 775 of FIG. 7 serve as memories that remember which of the two cameras covering a given midregion was last turned on. The manner in which these flip-flops are set to one or the other state will be later described. The 1 output leads of flip-flops 765 and 775 are delivered to the inputs of inverters 665 and 675, respectively. With flip-flop 765, for example, set to its "one" state a binary "1" signal will be delivered to the AND gate 666 to enable the same and thus divert the $AB\overline{CD}$ signal to the $A\overline{BCD}$ signal output lead so as to cause the enabling of camera $C_a$. Because of the inversion, the AND gate 667 is disabled at this time. If, however, the flip-flop 765 is set to its "zero" state, the AND gate 667 is enabled, the AND gate 666 is disabled, and the $AB\overline{CD}$ signal is diverted to the $B\overline{ACD}$ signal output lead. The other steering circuit operates in the same fashion, under the control of the information stored in flip-flop 775.

Figure 12:
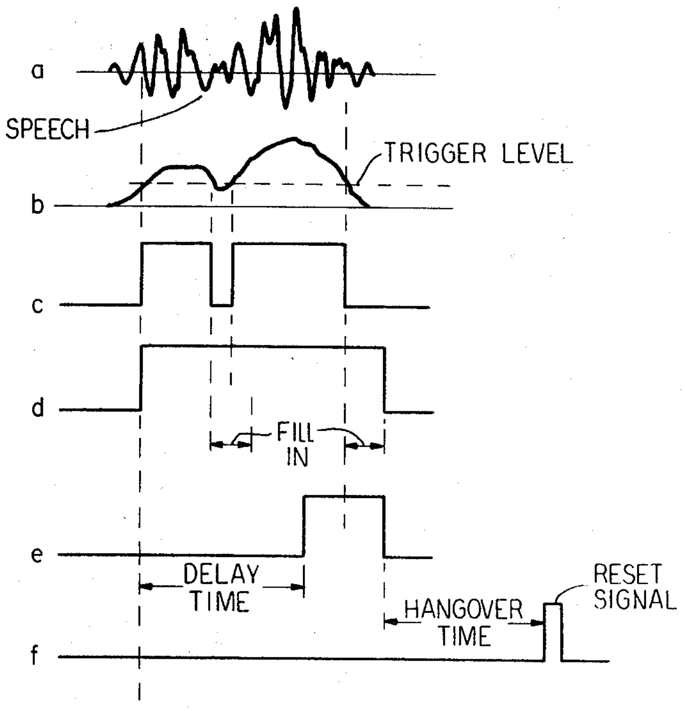
FIG. 12 illustrates certain waveforms useful in explanation of the invention.

The four output signals from the diverter 600 are delivered to the digital detection logic circuitry 650. This digital detection circuit comprises four identical circuits, 651 through 654 (one for each input signal from diverter 600) and therefore only one of the same need be described in detail. The logic circuit 651 comprises a "fill-in" circuit and an "attack-time" circuit. This fill-in circuit, in effect, fills in any short returns to the level-zero (i.e., binary "0") of the input signal on lead 611. This may, perhaps, be better appreciated by reference to the waveforms of FIG. 12. The waveform *a* of FIG. 12 illustrates a typical speech signal input to the circuit of FIG. 4. Waveform *b* shows the resulting rectified and smoothed signal input to the Schmitt trigger. For present purposes the aforementioned hysteresis effect can be disregarded. Waveform *c* shows the typical on-off (i.e., "1"–"0") pattern from the Schmitt trigger. If the speech originated in field or region A, the waveform *c* will be delivered to the input lead 611. The fill-in operation is depicted in waveform *d* of FIG. 12. When the signal on lead 611 returns to the level-zero state, the one-shot multivibrator 641 is triggered on by the negative-going transient and it delivers a short-duration output pulse (e.g. of 10 milliseconds) to OR gate 642. This short-duration pulse, when ORed with the binary signal of lead 611, results in an output signal from the OR gate 642 such as shown in waveform *d* of FIG. 12. Thus, the momentary interruption in waveform *c* is filled in.

The speed at which a new camera is turned on after speech has been detected can be controlled by a simple adjustment which permits any delay from 30 to 250 milliseconds (msec.) to be chosen. This delay time is called herein the "attack-time" and it is the function provided by the attack-time circuit to be described. The adjustment is made by means of a variable resistance in the multivibrator circuit 643. This attack-time delay is necessary to inhibit short-duration nonspeech sounds, such as table tapping, from causing a camera-switching operation. The attack-time circuit, in effect, looks to see if the signal from OR gate 642 stays at the binary "1" level for a predetermined time. At the end of this time interval, the flip-flop 645 is set to the "one" state, provided the input OR gate signal has remained at the binary "1" level for the required time.

The attack-time circuit comprises the inverter 644, the flip-flop 645, the integrating one-shot multivibrator 643 and the AND gate 646. Assume the output signal from the OR gate 642 is at a binary "0" level. This signal, when inverted in inverter 644, serves to reset the flip-flop 645—or, if the latter had already been in the reset state it remains so. When this OR gate signal goes to a binary "1" level, the multivibrator 643 begins timing or integrating for a predetermined time period; this period is designated "delay time" in waveform *e* of FIG. 12. The output of the one-shot multivibrator 643 is delivered to the AND gate 646 along with the binary "1," OR gate signal, which is coupled to gate 646 via lead 647. If the output signal from OR gate 642 remains at the binary "1" level for the duration of the preselected attack or delay time, the AND gate 646 is enabled, by multivibrator 643, at the end of the attack-time period and the flip-flop 645 is thus set to its "one" state. The flip-flop 645 remains in this state until such time that the OR gate output signal returns to its binary "0" level—this is indicative, of course, of a termination of speech.

Should the binary "1" output from OR gate 642 terminate sometime prior to the timing out of the integrating multivibrator 643, the AND gate 646 will not be enabled and flip-flop 645 will not be set to its "one" state. However, when the OR gate output signal once again returns to the binary "1" level, a new timing or integrating period is begun. That is, a new integrating delay time is initiated each time the input to multivibrator 643 goes from a binary "0" to a binary "1" level. The state of, and hence the output from, flip-flop 645 is shown in waveform *e* of FIG. 12.

The "fill-in" and "attack-time" features are needed, first, to prevent camera switching on short sounds such as pencil taps, and, second, to improve camera selection when a talker is in the midregion. Tests have shown that variations in the comparator circuits will cause short "A" and "B" signals even when the speech input is from the "A–B" region. These short false votes are most likely caused by small differences in the charge-discharge characteristics of the individual rectifier circuits, amplifier gains, frequency response, and operating thresholds of the Schmitt triggers. The false votes typically last less than 20 msec., which sets a practical limit as to how fast reliable switching should be made to occur. In conferences which use a table to mount the microphones, the minimum attack-time is controlled by the table's reverberation time. The table is like a drum and continues to emit sound after being struck by a pencil or other objects. Tests with conference tables of heavy construction indicate that this minimum time should be approximately 100 to 125 msec. A minimum attack-time in this range is still fast enough for satisfactory voice-controlled switching of the video. It is actually desirable to avoid too rapid a camera switching. The variable resistances (e.g. 649), that control attack-time, should preferably be ganged together.

Figure 7:
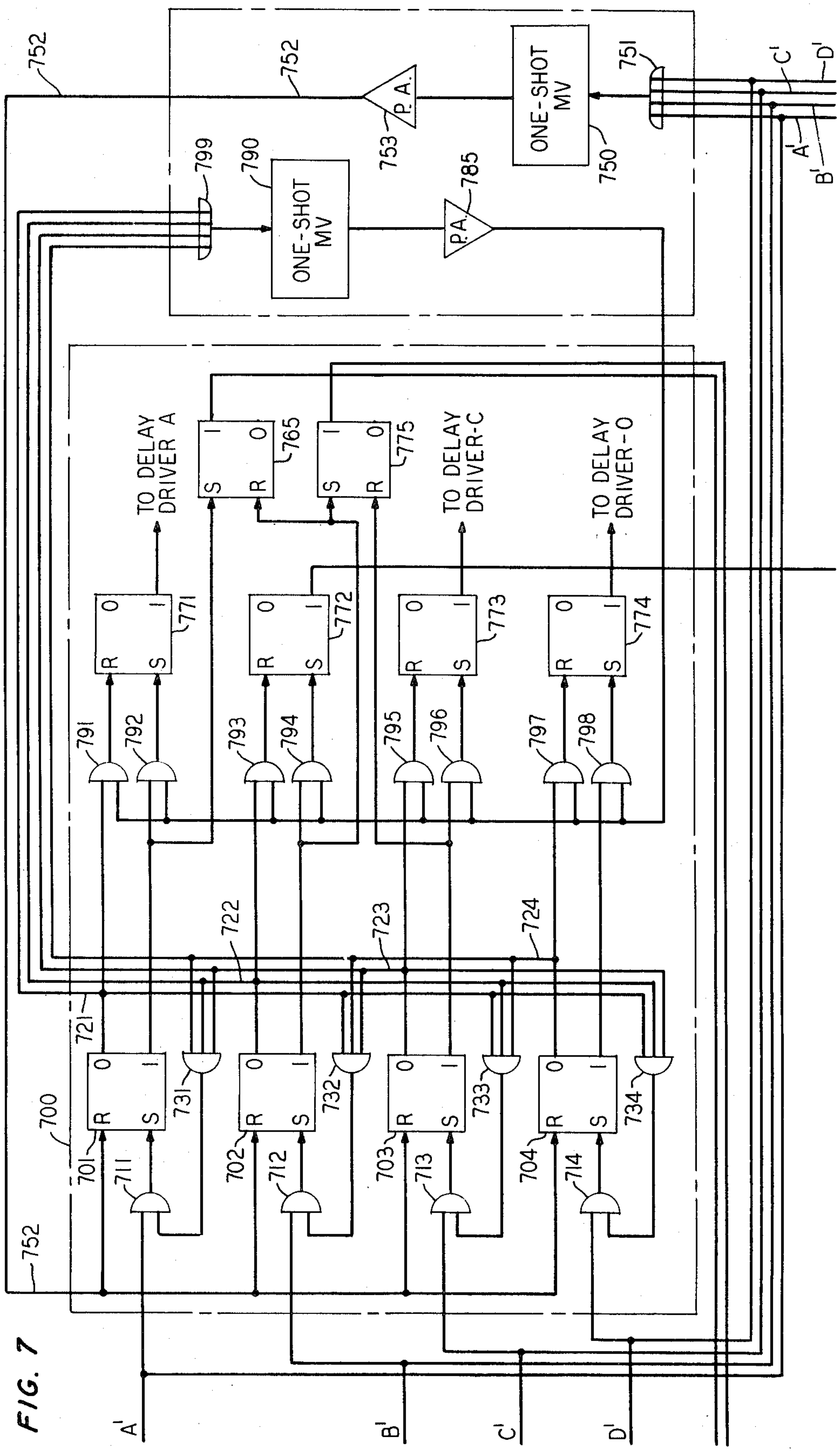

The digital detection logic circuit 650 delivers four output signals, A′, B′, C′, D′, to the buffer memory and storage circuit 700 of FIG. 7. Because of the operation of the preceding logic circuitry it will be evident that one and only one of these output signals will be at a binary "1" level at any given time. The primary function of the circuit 700 is to store the information as to which camera was the one last selected and to store the information regarding a new camera selection.

The output signals A′, B′, C′, D′ are respectively coupled to the flip-flops 701, 702, 703 and 704 via the AND gates 711, 712, 713 and 714. As will be evident shortly, new information cannot be read into the flip-flops 701 through 704 until the latter have been reset to their "zero" state. To this end, the four output signal leads from circuit 650 are connected to the input of the one shot multivibrator 750 via the OR gate 751.

The one-shot multivibrator 750 is designed so as to be enabled by the negative-going transient of one of the four signals delivered to OR gate 751. That is, when one of the four output signals from circuit 650 goes from a binary "1" to a binary "0" level, the one-shot multivibrator 750 is triggered on. The multivibrator 750 controls the speed at which a new talker can initiate a video-switching operation when he interrupts another talker in the same room. To this end, the multivibrator 750 should include means (e.g. a variable resistance) for controlling the duration of the output pulse therefrom. Typically, the output pulse from the one-shot multivibrator 750 should be of 300- to 500-msec. duration. This adjustable time is called "hangover" time. A hangover time in the range indicated has been found to be subjectively acceptable. With a hangover time of shorter duration, too rapid a camera-switching operation takes place and this has been found objectionable. At the end of this hangover time, a clear or reset pulse is delivered via lead 752 to the reset terminals of the flip-flops 701 through 704. At the end of the hangover pulse period, the negative-going transient serves to energize the pulse amplifier 753, which, in response thereto, generates a short-duration (e.g. several microseconds) reset pulse.

The "0" output leads of the flip-flops 701 through 704 are connected to the vertically running rail leads 721, 722, 723, and 724, respectively. AND gates 731, 732, 733 and 734 are connected to these rail leads in the manner indicated in FIG. 7 and hence when the flip-flops 701–704 are reset the AND gates 731–734 are enabled and deliver enabling signals to the inputs of AND gates 711 through 714, respectively. It should be evident from the foregoing that new information cannot be read into the flip-flops 701–704 until the same are reset to their "zero" state. For example, assume that the flip-flop 701 had previously been set to its "one" state in response to a binary "1" on the output signal lead A′. Now if the B′ output signal goes to a binary "1" level it cannot be read into flip-flop 702 until the AND gate 712 is enabled. For the AND gate 712 to be enabled the AND gate 732 must first be enabled, but with the flip-flop 701 in its "one" state the 0 output lead thereof is at a binary "0" level and the AND gate 732 will thus remain disabled until flip-flop 701 is reset.

The new information read into the bank of flip-flops 701 through 704 is next transferred to the bank of storage flip-flops 771, 772, 773 and 774, respectively. The 0 and 1 output leads of flip-flops 701–704 are respectively connected to the reset and set terminals of the flip-flops 771–774 via the AND gates 791 through 798. To insure that the flip-flops 701–704 are settled in a steady-state condition before transfer, a short delay is provided between the read-in of the information to flip-flops 701–704 and the enabling of the AND gates 791–798. To this end, the rail leads 721–724 are coupled to the input of the one-shot multivibrator 790 via the OR gate 799. With the read-in of new information to flip-flops 701–704, one of the 0 output leads thereof will go from a binary "1" to a binary "0" level and this serves to trigger the one-shot multivibrator 790. The one-shot multivibrator 790 delivers a short duration (e.g. 10 msec.) output pulse to the pulse amplifier 785. The negative-going transient of the output pulse from multivibrator 790 serves to generate a microsecond pulse in pulse amplifier 785, which is delivered to the AND gates 791–798 to enable the same. The information then stored in flip-flops 701–704 is read into the storage flip-flops 771–774 where it remains until a new read-in or transfer operation occurs.

The output of flip-flop 771 is delivered to RELAY DRIVER-A for the purpose of enabling camera $C_a$ when the flip-flop 771 is set to its "one" state. The output of flip-flop 772 is delivered to the mode selector logic circuit 900 where in response to the mode selected it is coupled to either RELAY DRIVER-B or RELAY DRIVER-G so as to respectively enable either the camera $C_b$ or camera $C_g$. The output of flip-flop 773 is delivered to RELAY DRIVER-C for the purpose of enabling camera $C_c$. The output of the flip-flop 774 is delivered to the RELAY DRIVER-O for the purpose of enabling the overview camera $C_o$. Flip-flop 774 is set to its "one" state in response to a sustained silence that occurs during the normal mode of operation.

As the flip-flops 771–774 are successively set and reset in response to voice-switching or mode selection signals, the various cameras are successively enabled and disabled in accordance with the operational procedures previously described.

The flip-flops 765 and 775 serve as memories that remember which of the two cameras covering a given midregion was last turned on. For example, the set terminal of flip-flop 765 is connected to the 1 output lead of flip-flop 701, while the reset terminal thereof is connected to the 1 output lead of flip-flop 702. The 1 output lead of flip-flop 765 is delivered to the input of inverter 665. Now in the process of enabling the camera $C_a$, the flip-flop 765 will be set to its "one" state. Camera $C_a$, it will be recalled, is enabled in response to a talker in field or region A. With the flip-flop 765 so set, the AND gate 666 of the diverter logic 600 is enabled and the AND gate 667 is disabled. Now a talker in the midregion A–B is, of course, covered by cameras $C_a$ AND $C_b$, and a speech signal from a person in this midregion initiates the midregion signal $AB\overline{CD}$ from the AND gate logic 580. This midregion signal is diverted via AND gate 666 such that the camera $C_a$ (i.e., the camera last turned on) is enabled. If the camera $C_b$ was last turned on just prior to a speech signal from the midregion A–B, the flip-flop 765 will be in its reset state with the result that the midregion signal $AB\overline{CD}$ will be diverted via AND gate 667. The function of flip-flop 775 is similar and should be apparent from the preceding discussion.

Figure 8:
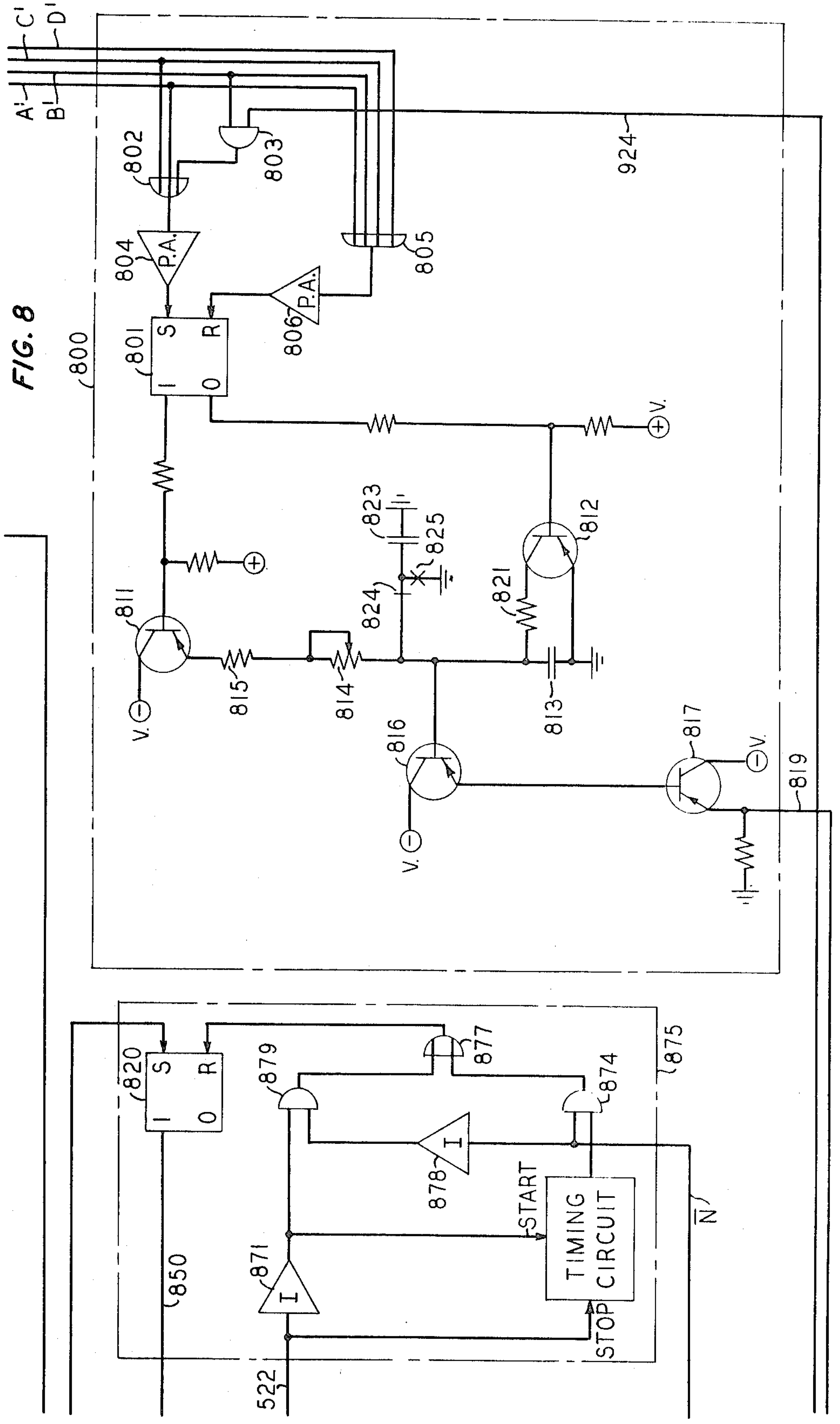
Figure 9:
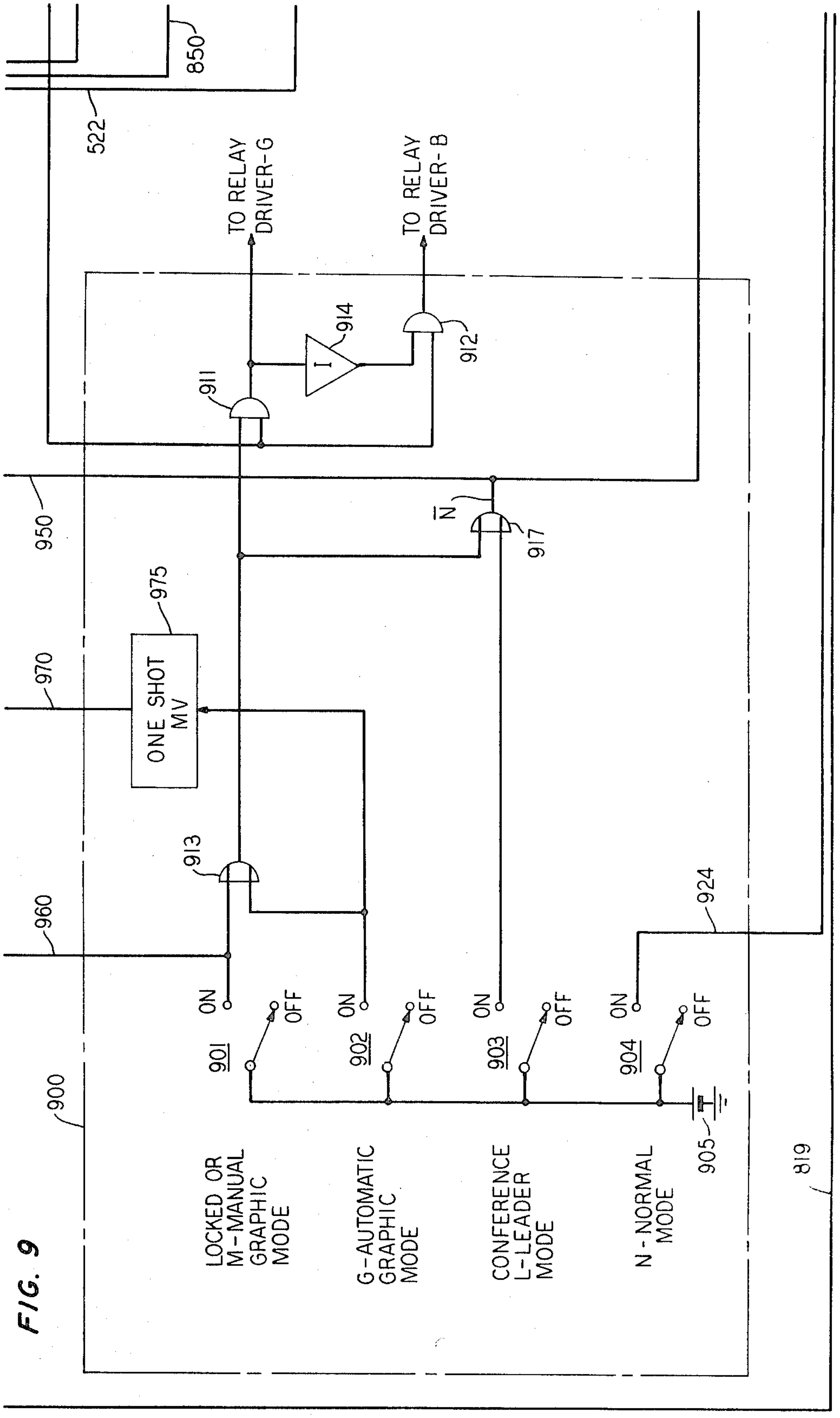

Turning now to the automatic reverting circuit 800 of FIG. 8, the primary purpose of the same is to detect the occurrence of a sustained silence. If the silence continues for a preset time, a signal of appropriate amplitude is delivered to the input of Schmitt trigger 504 and causes the same to be energized or triggered on. For the normal mode, the energization of Schmitt trigger 504 results in the enabling or switching in of the overview camera $C_o$. When the automatic graphic mode is selected, the reverting signal serves to enable the camera $C_g$; and when the conference leader mode is selected, the reverting signal serves to enable camera $C_b$ which views the region B, in which the conference leader is located.

The reverting signal is in the nature of an RC charging waveform, which, in the presence of a sustained silence, increases until it reaches the threshold value of the Schmitt trigger circuit 504. The RC-charging waveform is initiated or begun when the flip-flop 801 of FIG. 8 is set to its "one" state and it is terminated when this flip-flop is reset to its "zero" state. The flip-flop 801 is set in the following manner. The OR gate 802 is connected directly to the output signal leads A′ and C′ from the digital detector 650 and it is connected to the B′ signal lead via the AND gate 803. The AND gate 803 is connected to the normal mode switch 904 of FIG. 9 and when the system is set to the normal mode, the AND gate 803 is enabled and couples the B′ signal to the input of OR gate 802. In the normal mode, a silence at all three locations (i.e., A, B and C) starts the reversion timing. That is, the timing is initiated when any one of the A′, B′, or C′ signals goes from the binary "1" to the binary "0" level. The pulse amplifier 804 is energized by this negative-going transient and it delivers a short-duration pulse to the set terminal of flip-flop 801 to set the same to the "one" state. For the leader and automatic graphic modes, this reversion timing is initiated, in the manner described, by a silence at locations or regions A and C.

The flip-flop 801 is reset to its "zero" state as follows. The OR gate 805 is directly connected to the signal leads A′, B′, C′ and D′. Accordingly, if one of the A′, B′ or C′ signals goes from a binary "0" to a binary "1" level, indicative, for example, of a speech signal from one of the locations A, B or C, the pulse amplifier 806 is energized by this positive-going transient and it delivers a short-duration pulse to the reset terminal of flip-flop 801. This, as indicated, terminates the reversion-timing operation.

As will be recalled, the D′ signal from the digital detector 650 is delivered to the flip-flop 704 and thence to the storage flip-flop 774. The binary "1" output of flip-flop 774 serves to enable the overview camera $C_o$. Now once the storage flip-flop 774 is set to its "one" state, the D′ signal should be returned to its binary "0" level. Otherwise, the system would be "latched-up" and no further camera switching could occur. To this end, the D′ signal lead is also coupled to the input of OR gate 805. When the D′ signal goes to the binary "1" level the OR gate 805 couples this positive-going transient to the pulse amplifier 806, which is thus energized to deliver a short-duration pulse to the reset terminal of flip-flop 801. The reverting operation is then terminated, in the manner to be described; the analog input to Schmitt trigger 504 then drops below the threshold thereof; the Schmitt trigger goes to its deenergized state; and the output signal D′ from digital detector 650 goes to its binary "0" level.

When the flip-flop 801 is set to its "one" state, the 1 output lead thereof delivers an energizing signal to the base of transistor 811, causing the same to conduct. Simultaneously therewith, the 0 output lead of flip-flop 801 goes to its binary "0" level and the transistor 812 is thereby cut off. With transistor 811 conducting, a path is complete from ground, through capacitance 813, variable resistance 814, fixed resistance 815 and the emitter-collector path of transistor 811 to the source −V. A charge across the capacitance 813 builds up in the standard manner; and, the variable resistance 814 controls the rate of charge. The transistors 816 and 817 are connected in a conventional Darlington configuration so as to present a high-input impedance and thus minimize the loading across capacitance 813. The signal across the resistance in the emitter path of transistor 817 corresponds to the RC-charging signal developed across capacitance 813 and it is this signal that is delivered to the input of Schmitt trigger 504 via the lead 819.

When the flip-flop 801 is reset to its "zero" state, as described, the transistor 811 is cut off. The transistor 812 is driven into conduction and hence it provides a low impedance discharge path across the capacitance 813 to rapidly discharge the same. The small resistance 821 (e.g., 100 ohms) protects the transistor 812 against the initial high current surge.

The reverting time for the overview camera (i.e., normal mode) should preferably be greater than that for the graphic or leader cameras. A reverting time of 9 seconds for the normal mode is satisfactory. For the conference leader and automatic graphic modes, a reverting time of 3 seconds has proved advantageous. During normal mode operation, the capacitance 823 is connected in parallel with the capacitance 813 via the break-contact 824. This increased capacitance in the RC-charging path results in increased time before a given threshold level is reached. When the automatic graphic mode or conference leader mode is selected the break-contact 824 opens and the make-contact 825 closes. Thus, the capacitance 823 is removed from the charging path and it is discharged via the make-contact 825. In this latter condition, less time is required before said given threshold level is reached.

The contacts 824 and 825 can be operated, as described, by the manual closure of the leader or automatic graphic mode switches. Alternatively, the closure of either switch can be used to energize a relay which operates the contacts 824 and 825, as described.

The extra hangover circuit 875 of FIG. 8 includes the flip-flop 820 which, when set in its "one" state, delivers a binary "1" signal to OR gate 520 via the lead 850. This signal to OR gate 520 is in the nature of an extra or ancillary hangover signal and it establishes a preference or bias in favor of speech in the B field or location of FIG. 1. This bias is desirable when operating in the conference leader or automatic graphic modes in that it makes it more difficult for a talker in the A or C region to break in—i.e., to initiate a switching operation.

The B′ output signal of the digital detector 650 is coupled to the set terminal of flip-flop 820 via the pulse amplifier 690. In response to a positive-going transient, the pulse amplifier 690 delivers a microsecond pulse to the set terminal of the flip-flop 820 to set the same to the "one" state. Thus, the flip-flop 820 delivers a binary "1" signal to OR gate 520.

The output of AND gate 512 is delivered via the lead 522 to the input of inverter 871 and to the "stop" input of the timing circuit 873. When a talker in field or region B stops talking the output of AND gate 512 goes from the binary "1" to binary "0" level, which, when inverted in inverter 871, is coupled to the "start" input of timing circuit 873 to initiate a timing operation therein. The timing circuit 873 comprises an RC-charging circuit, such as that of the reverting circuit 800, followed by a Schmitt trigger. Upon receiving a start signal, the RC-charging network will begin the generation of a typical RC-charging charging waveform which increases more or less linearly until it reaches the selected threshold level of the Schmitt trigger. Should said threshold level be reached the Schmitt trigger fires and delivers a binary "1" signal to AND gate 874. However, if during this timing or charging period the output of AND gate 512 returns to the binary "1" level indicative of a talker in region B, the timing is interrupted by the application of this binary "1" to the stop terminal of the timing circuit 873.

In the conference leader or automatic graphic modes, the mode selector logic circuit 900 of FIG. 9 delivers an energizing binary "1" signal (i.e., $\overline{N}$) to the AND gate 874. In either of these modes the AND gate 874 is thus enabled to deliver the binary "1" output from the Schmitt trigger of the timing circuit 873 to the reset terminal of flip-flop 820 via OR gate 877. The flip-flop 820 is thereby reset. Summarizing the above, an enabling level-one signal is delivered by flip-flop 820 to the OR gate 520 for a duration (e.g., 2.0 sec.) determined by the timing circuit 873. Thus, even though a talker at B may temporarily stop talking the switching circuit is, in effect, "latched-up" for the timing circuit period of 2.0 seconds. The extra hangover circuit 875 thus establishes a bias or preference in favor of speech at the B location when operation is in the automatic graphic or conference leader mode. And a talker at the A or C field location cannot be voted in until the expiration of this hangover or timing period.

This extra hangover is undesirable for operation in the normal mode. In this latter mode, the $\overline{N}$ signal from the mode selector logic circuit 900 is at level-zero. The AND gate 874 is thus disabled, but because of the inversion function of inverter 878 the AND gate 879 is enabled during the normal mode. Accordingly, when the output of AND gate 512 goes to binary "0," the inverter 871 immediately delivers a binary "1" signal to the reset terminal of flip-flop 820 via the enabled AND gate 879 and OR gate 877. Thus, no extra hangover signal results for normal mode operation.

Turning now to the mode selector of FIG. 9, the switches 901, 902, 903 and 904 are used to select the mode of operation desired. These switches are mechanically connected so that only one can be "on" at a time. This is conventional practice in the telephone art. The locked or manual graphic mode switch 901 applies an energizing signal from source 905 to OR gate 520 via lead 960. This serves to set flip-flop 772 to its "one" state and, as a result, the graphic camera $C_g$ is enabled. The graphic camera $C_g$ is locked to the outgoing video line and no other camera can be similarly enabled as long as the graphic mode switch 901 connects source 905 to OR gate 520.

The automatic graphic mode switch 902 connects source 905 to the one-shot multivibrator 975 and the latter delivers, in response thereto, a short-duration pulse to the OR gate 520 via lead 970. As should be apparent from the previous description, this pulse initiates the enabling of the graphic camera $C_g$. The pulse from multivibrator 975 should be slightly longer in duration than the delay time indicated in waveform *e* of FIG. 12. This pulse is generated only once for each instance that the automatic graphic mode is selected.

As stated above, the output of flip-flop 772 is delivered to the selector logic circuit 900 where in response to the mode selected it is coupled to either RELAY DRIVER-B or RELAY DRIVER-G so as to enable either the camera $C_b$ or camera $C_g$. To this end, the 1 output lead of flip-flop 772 is coupled to the input of AND gates 911 and 912. If either the locked graphic or automatic graphic mode is selected, an energizing signal is connected from source 905 to the input of AND gate 911 via OR gate 913. Thus, when either graphic mode has been selected and the flip-flop 772 is set to its "one" state, the AND gate 911 delivers a binary "1" signal to the RELAY DRIVER-G. Because of the inversion function provided by inverter 914, the AND gate 912 is disabled at this time. However, if the flip-flop 772 is set to its "one" state and the system is not set to either of its graphic modes, the AND gate 912 is enabled so as to deliver a binary "1" signal to RELAY DRIVER-B and thereby switch in camera $C_b$.

The not-normal mode signal $\overline{N}$ is used to steer the output signal of Schmitt trigger 504 and to enable the AND gate 874 of the extra hangover circuit 875, all as heretofore described. An $\overline{N}$ signal is indicative of the fact that a mode other than the normal mode has been selected. This signal is derived by connecting the OR gate 917 to the output of OR gate 913 and to the "ON" contact of the leader mode switch 903.

When the normal mode is selected, the source 905 is connected via switch 904 and lead 924 to the AND gate 803 so as to enable the same for the purpose previously described.

Figures 10, 11:
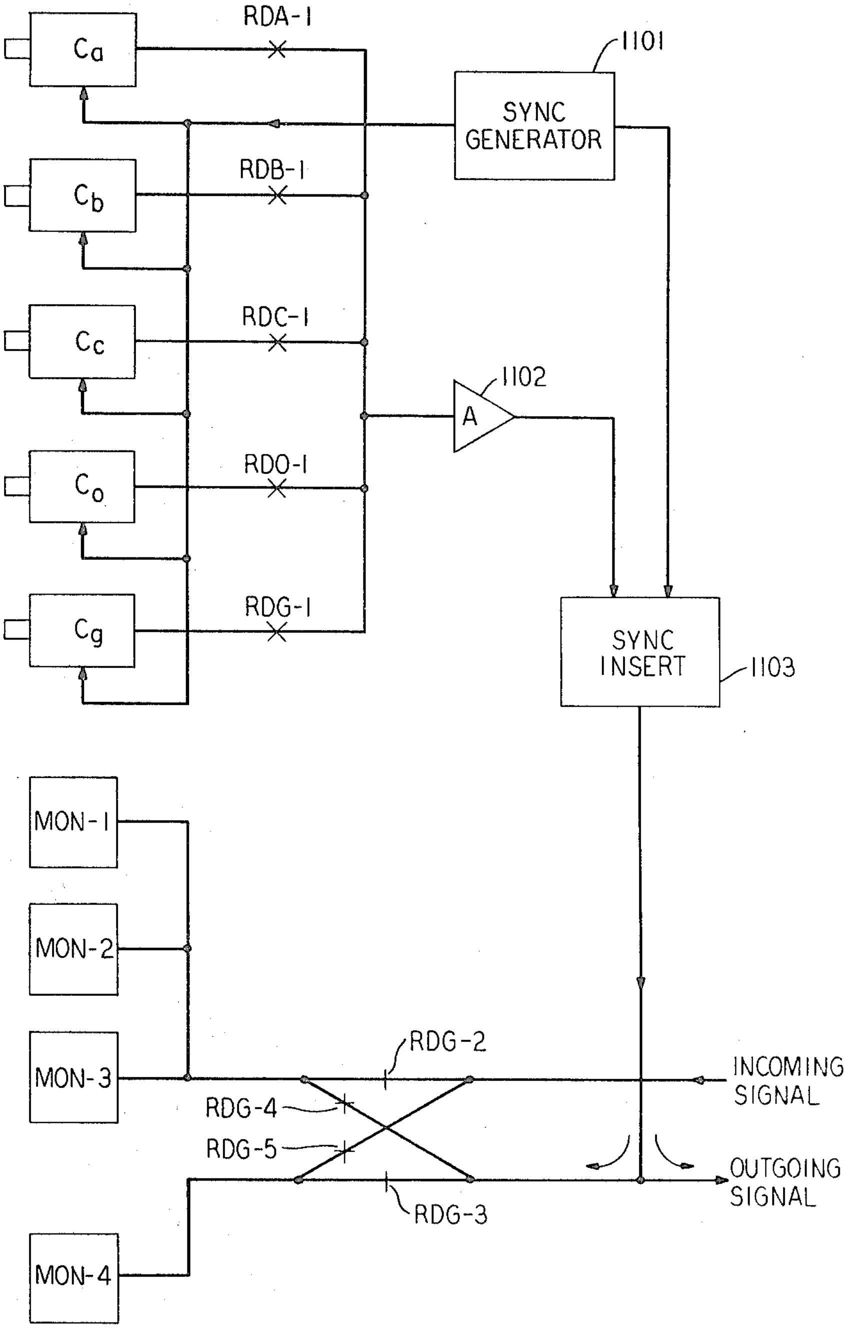
FIG. 11 shows a detailed schematic drawing of the video-switching network.

Referring now to FIG. 11, the synchronizing generator 1101 supplies the requisite horizontal and vertical blanking signals to the five cameras $C_a$, $C_b$, $C_c$, $C_o$ and $C_g$ which in turn supply the video-switching network with blanked picture signals. It is a preferable practice to lock in the scanning of the various cameras to the same time base with a common sync generator. Switching between various camera signals should be done before adding the sync pulses required for picture display. Then random switching of the signals does not cause any interruption in the sync signal. Accordingly, each camera output is connected via a respective make-contact to the buffer amplifier 1102 and thence to the sync insert circuit 1103 for the insertion of the horizontal and vertical synchronization pulses from generator 1101. The composite output signal from sync insert 1103 is then delivered to the outgoing video transmission line, and to the local monitors in the manner to be described.

The cameras $C_a$, $C_b$, $C_c$, $C_o$ and $C_g$ are respectively connected to the amplifier 1102 via the respective make-contacts RDA–1, RDB–1, RDC–1, RDO–1 and RDG–1. The RELAY DRIVER-A, when energized, serves to close contact RDA–1; RELAY DRIVER-B serves to close the make-contact RDB–1; and so on. The logic circuit design is such that only one of these contacts is closed at any given time.

For all modes but graphic, the incoming video signal is coupled to the monitors MON–1, MON–2 and MON–3 via the break-contact RDG–2, while the outgoing video is coupled to monitor MON–4 via the break-contact RDG-3. As heretofore described, for the graphic modes the three local monitors MON–1, MON–2 and MON–3 display the outgoing graphic video, while the incoming video is now displayed on MON–4. This switching is accomplished by the use of additional contacts associated with the graphic, RELAY DRIVER-G. When the latter is energized the associated contacts RDG–2 and RDG–3 open and the make-contacts RDG–4 and RDG–5 close. Thus, the incoming video signal is coupled to MON–4 via contact RDG-5 and the outgoing graphic video is coupled to the three local monitors via closed contact RDG–4.

Figure 13:
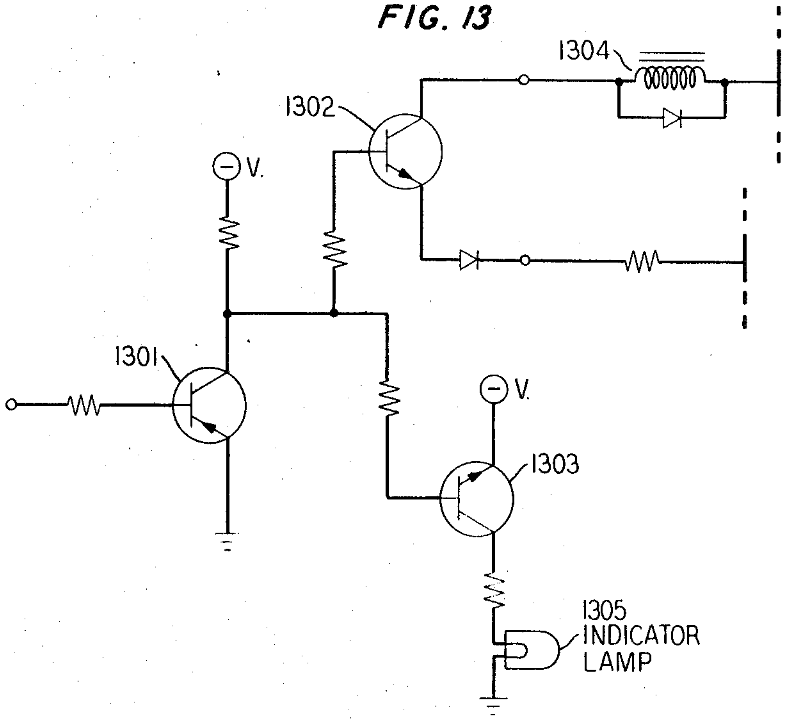
FIG. 13 shows a typical relay driver circuit.

A typical RELAY DRIVER is shown in FIG. 13 of the drawings. This circuit is of conventional design and therefore will only be briefly described herein. Initially all there transistors 1301, 1302 and 1303 are cut off. When an enabling binary "1" signal is delivered to the base of transistor 1301 the same is caused to conduct and this initiates conduction in the transistors 1302 and 1303. The emitter-collector path of transistor 1302 is in the current path of relay coil 1304 and hence when transistor 1302 conducts, current flows through the relay coil which actuates the relay contacts associated therewith. The conducting transistor 1303 completes the path for indicator lamp 1305, so as to provide a visual indication of the operative state of the RELAY DRIVER.

Various modifications of the system described should be readily apparent at this point. For example, the use of three cameras to cover the group of conferees was arbitrarily chosen for descriptive purposes; a system using two, four or five such cameras can be readily implemented. Further, it is not essential that the fields of the cameras overlap. The conferees, may, for example, be grouped into subgroups, with each such subgroup disposed in one well-defined camera field. The number and disposition of the local monitors can also be changed, as desired. The cameras switching rates (i.e., attack and hangover times) can be readily varied, as can the bias or preference given the conference leader. Without further belaboring the point, it should be obvious at this time that the above-described arrangement is merely illustrative of the application and of the principles of the present invention and numerous modifications thereof may be devised by those skilled in the art without departing from the spirit and scope of the invention.

What is claimed is:

1. In a video system for conference connecting a plurality of groups of remotely located conferees, a plurality of video cameras disposed at a group location so that the field of view of each camera is respectively restricted to a small number of persons in the group, a plurality of microphones positioned before said group with the microphones being equal in number to said plurality of video cameras, the microphone positions with respect to said group corresponding to the fields of view of the cameras, means for transmitting video signals from said group location to one or more remote group locations, and voice voting and switching means coupled to said microphones for determining the location of the person in the group who is talking and in response thereto preempting connecting the camera covering the talker to the video-transmitting means.

2. A video system as defined in claim 1 including means for controlling the rapidity with which successive camera-switching connections are established in response to speech by different people at different locations in said group.

3. A video system as defined in claim 2 including means to prevent the initiation of a camera-switching connection in response to short-duration nonspeech sounds.

4. A video system as defined in claim 1 including monitor means at said group location for displaying the video signal that is being transmitted to said one or more remote group locations.

5. A video system as defined in claim 1 including an overview camera whose field of view encompasses the whole of said group, and means for alternatively connecting said overview camera to the video-transmitting means in the presence of a sustained silence of predetermined duration at said group location.

6. A video system as defined in claim 5 including control means for determining the duration of sustained silence that is required before an overview camera-switching connection is initiated.

7. A video system as defined in claim 1 including a video camera dedicated to the production of video signals of graphic and written material disposed in the field of view thereof.

8. A video system as defined in claim 7 including means for establishing a locked connection from the dedicated graphic camera to the video-transmitting means and for preempting all other connections while said locked connection is maintained.

9. A video system as defined in claim 7 including means for alternatively connecting the dedicated graphic camera to the video-transmitting means in the presence of a sustained silence of predetermined duration in selected fields or sections of the group.

10. A video system as defined in claim 9 including control means for determining the duration of sustained silence that is required before the dedicated graphic camera-switching connection is initiated.

11. A video system as defined in claim 10 including means for establishing a preference in favor of said graphic camera switch connection so that sustained speech in one of said fields of said group is required before said graphic camera connection is discontinued.

12. A video system as defined in claim 1 wherein a conference leader position is selected within the field of view of a predetermined one of said cameras, and means for alternatively connecting the conference leader directed camera to the video-transmitting means in the presence of a sustained silence of predetermined duration in the other fields of said group location.

13. A video system as defined in claim 12 including control means for determining the duration of sustained silence that is required before the conference leader camera-switching connection is initiated.

14. A video system as defined in claim 13 including means for establishing a preference in favor of the conference leader camera switch connection so that sustained speech in one of the other fields is required before the latter switching connection is discontinued.

15. A video system as defined in claim 1 including means for coupling the speech signals picked up by the microphones to said transmitting means so that the audio signals are transmitted along with said video signals.

16. A video system as defined in claim 15 including means for displaying at said group location the video signals received from a remote group location, and means for reproducing at said group location speech signals from the remote group location.

17. A video system as defined in claim 1 wherein the fields of view of the cameras overlap so that some conferees lie in the fields of view of two adjacent cameras.

18. A video system as defined in claim 17 including means for connecting a given camera of two adjacent cameras to the video-transmitting means in response to speech from the overlap region of two adjacent cameras, the camera selected being the one of said two adjacent cameras that was last connected to the video-transmitting means.

19. A television system for conference-connecting a plurality of groups of remotely located conferees comprising a plurality of video cameras disposed at a group location so that the field of view of each camera is respectively restricted to a small number of persons in the group, a plurality of microphones positioned before said group with the microphones being equal in number to said plurality of video cameras, the microphone positions with respect to said group corresponding to the fields of view of the cameras, means for transmitting audio and video signals from said group location to one or more remote group locations, voice-voting means coupled to said microphones for determining the field of view location of the person in the group who is talking, switching means operative in response to the output of said voice-voting means for establishing a mutually exclusive switching connection between the camera covering the talker and the transmitting means, monitor means at said group location for displaying the video signal being transmitted therefrom, means for coupling the audio signals at said group location to said transmitting means, receiver display means at said group location for displaying video signals received from a remote group location, and means for reproducing at said group location audio signals received from a remote group location.

20. A television system as defined in claim 19 including an overview camera whose field of view encompasses the whole of said group, and means for alternatively connecting said overview camera to said transmitting means in the presence of a sustained silence of predetermined duration at said group location.

21. A television system as defined in claim 19 including a video camera dedicated to the production of video signals of graphic and written material disposed in the field of view thereof.

22. A television system as defined in claim 21 including means for establishing a locked connection from the dedicated graphic camera to said transmitting means and for preempting all other connections while said locked connection is maintained.

23. A television system as defined in claim 21 including means for alternatively connecting the dedicated graphic camera to said transmitting means in the presence of a sustained silence of predetermined duration in selected fields or sections of the group.

24. A television system as defined in claim 23 including means for establishing a preference in favor of said graphic camera switch connection so that sustained speech in a selected field of said group is required before said graphic camera connection is discontinued.

25. A television system as defined in claim 19 wherein a conference leader position is selected within the field of view of a predetermined one of said cameras, and means for alternatively connecting the conference leader directed camera to said transmitting means in the presence of a sustained silence of predetermined duration in the other fields of said group location.

26. A television system as defined in claim 25 including means for establishing a preference in favor of the conference leader camera switch connection so that sustained speech in said other fields is required before the latter switching connection is discontinued.

27. A television system as defined in claim 19 wherein the fields of view of the cameras overlap so that some conferees lie in the fields of view of two adjacent cameras.

28. A television system as defined in claim 27 including means for connecting a given camera of two adjacent cameras to said transmitting means in response to speech from the overlap region of two adjacent cameras, the camera selected being the one of said two adjacent cameras that was last connected to said transmitting means.

29. In a multigroup video conferencing system which includes a plurality of video cameras disposed at a group location so that the field of view of each camera is respectively restricted to a small number of persons in the group and the fields of view of the cameras overlap so that some conferees lie in the fields of view of two adjacent cameras; a plurality of microphones positioned before said group with the microphones being equal in number to the plurality of video cameras, the microphone positions with respect to said group corresponding to the fields of view of the cameras, a rectifier means respectively connected to each microphone, a first series of transistors connected in a common emitter configuration such that conduction therein is mutually exclusive, a second series of transistors also connected in a common emitter configuration to provide mutually exclusive conduction therein, the number of transistors in each of said first and second series being equal to the number of said microphones, and means for connecting the bases of said first and second series of transistors to said rectifier means in a manner such that operative output signals are respectively provided at the collectors of preselected transistors in said first and second series in response to speech signals from predetermined respective fields of the group location and operative output signals are provided at the collectors of a predetermined pair of said preselected transistors in response to speech signals from a given region of field overlap.

30. A video system as defined in claim 29 including means for varying the effective region of field overlap.